(12) United States Patent
Luly et al.

(10) Patent No.: US 8,784,763 B2
(45) Date of Patent: Jul. 22, 2014

(54) METHODS AND REACTOR DESIGNS FOR PRODUCING PHOSPHORUS PENTAFLUORIDE

(75) Inventors: Matthew H. Luly, Hamburg, NY (US); Robert A. Smith, Kinnelon, NJ (US); Haridasan K. Nair, Williamsville, NY (US); Philip DePrato, Annandale, NJ (US); Konstantin A. Pokrovski, Orchard Park, NY (US); Daniel C. Merkel, West Seneca, NY (US); Kevin Uhrich, Alden, NY (US); Stephen A. Cottrell, Baton Rouge, LA (US); Daniel J. Brenner, Madison, NJ (US)

(73) Assignee: Honeywell International Inc., Morristown, NJ (US)

( * ) Notice: Subject to any disclaimer, the term of this patent is extended or adjusted under 35 U.S.C. 154(b) by 1138 days.

(21) Appl. No.: 12/722,390

(22) Filed: Mar. 11, 2010

(65) Prior Publication Data
US 2010/0233057 A1    Sep. 16, 2010

Related U.S. Application Data

(60) Provisional application No. 61/207,886, filed on Mar. 13, 2009, provisional application No. 61/178,464, filed on May 14, 2009, provisional application No. 61/178,468, filed on May 14, 2009.

(51) Int. Cl.
*C01B 25/10* (2006.01)

(52) U.S. Cl.
USPC .................................................. 423/301

(58) Field of Classification Search
USPC .............................. 423/301, 322, 489
See application file for complete search history.

(56) References Cited

U.S. PATENT DOCUMENTS

| | | | |
|---|---|---|---|
| 2,153,953 A | * | 4/1939 | Burke .................. 23/294 R |
| 3,584,999 A | | 6/1971 | Wiesboeck |
| 3,634,034 A | | 1/1972 | Nickerson et al. |
| 6,322,764 B1 | | 11/2001 | Smith et al. |
| 6,645,451 B1 | | 11/2003 | Schulz et al. |

FOREIGN PATENT DOCUMENTS

| | | |
|---|---|---|
| CN | 1317445 A | 10/2001 |
| DE | 814 139 | 9/1951 |
| EP | 2123600 A1 | 11/2009 |
| EP | 2189418 A1 | 5/2010 |

(Continued)

OTHER PUBLICATIONS

O'Hare et al. "Fluorine Bomb Calorimetry", 1996, Argonne National Labs, p. 2709-2715.*

(Continued)

*Primary Examiner* — Stanley Silverman
*Assistant Examiner* — Syed Iqbal
(74) *Attorney, Agent, or Firm* — Ingrassia Fisher & Lorenz, P.C.

(57) ABSTRACT

Processes and systems for the production of phosphorus pentafluoride ($PF_5$) through continuous fluorination of phosphorus are provided herein. A phosphorus feed stream and a fluorine feed stream are provided to a reactor, wherein they are reacted in a gas-gas or liquid-gas reaction to produce phosphorus pentafluoride ($PF_5$). The phosphorus feed can be derived from white phosphorus or yellow phosphorus, and can be provided to the reactor as a liquid or a vapor. The fluorine can be provided to the reactor as a vapor, and preferably comprises elemental fluorine gas.

4 Claims, 4 Drawing Sheets

(56) References Cited

FOREIGN PATENT DOCUMENTS

| | | |
|---|---|---|
| JP | 2001-122605 A | 5/2001 |
| JP | 2007-513853 A | 5/2007 |
| RU | 2 075 435 C1 | 3/1997 |
| RU | 95 111 015 A1 | 6/1997 |
| RU | 1 840 412 A1 | 1/2007 |
| WO | 03/040034 A1 | 5/2003 |
| WO | 2005-061381 A1 | 7/2005 |
| WO | 2008-096724 A1 | 8/2008 |
| WO | 2009-022676 A1 | 2/2009 |

OTHER PUBLICATIONS http://www.chemguide.co.uk/physical/basicrates/introduction.html, 2008.*

D.K. Padma et al., "Low temperature fluorination of some non-metals and non-metal compounds with fluorine," Indian Journal of Chemistry, vol. 30A, Feb. 1991, pp. 172-176.

P. Gross et al., "Heat of Formation of Phosphorus Pentafluoride," Fulmer Research Institute Report, May 6, 1966, 3 pages.

* cited by examiner

US 8,784,763 B2

METHODS AND REACTOR DESIGNS FOR PRODUCING PHOSPHORUS PENTAFLUORIDE

RELATED APPLICATIONS

This application claims the benefit of U.S. Provisional Application Ser. No. 61/207,886, entitled Process for Making Phosphorus Pentafluoride, which was filed on Mar. 13, 2009; U.S. Provisional Application Ser. No. 61/178,464, entitled Method for Producing Phosphorus Pentafluoride, which was filed on May 14, 2009; and U.S. Provisional Application Ser. No. 61/178,468, entitled Novel Reactor Design for the Direct Fluorination, which was filed on May 14, 2009. The disclosure of each is hereby incorporated by reference in its entirety.

FIELD OF THE INVENTION

The present technology relates to the production of phosphorus pentafluoride ($PF_5$), and more particularly relates to direct fluorination of phosphorus with elemental fluorine to produce phosphorus pentafluoride ($PF_5$).

DESCRIPTION OF RELATED ART

Phosphorus pentafluoride ($PF_5$) can be used to commercially produce lithium hexafluorophosphate ($LiPF_6$), which is an electrolyte useful in lithium ion batteries. Among commercially produced batteries, lithium ion batteries have one of the best energy-to-weight ratios, no memory effect, and a slow loss of charge when not in use. In addition to powering consumer electronics, lithium-ion batteries are growing in popularity for defense, automotive, and aerospace applications due to their high energy density.

Some conventional methods for preparing phosphorus pentafluoride ($PF_5$) are known in which phosphorus pentafluoride ($PF_5$) is produced along with other reaction products, and must be purified prior to removing those other reaction products.

For example, one method for producing phosphorus pentafluoride ($PF_5$) includes a two step process in which polyphosphoric acid is treated with excess hydrogen fluoride (HF) to produce hexfluorophosphoric acid, which then reacts with excess hydrogen fluoride (HF) and fuming sulfuric acid to produce the phosphorus pentafluoride ($PF_5$). Another method is the fluorination of phosphorus pentachloride ($PCl_5$) with hydrogen fluoride (HF) to produce phosphorus pentafluoride ($PF_5$) along with hydrogen chloride (HCl) as follows:

$$PCl_5 + 5HF \rightarrow PF_5 + 5HCl \quad (1)$$

Phosphorus pentafluoride ($PF_5$) can also be prepared by reacting phosphorus trichloride ($PCl_3$) with elemental chlorine, bromine, or iodine and hydrogen fluoride (HF); or by the thermal decomposition (300° C.-1000° C.) of salts of hexafluorophosphoric acid (e.g. $NaPF_6$) as follows:

$$NaPF_6 \rightarrow NaF + PF_5 \quad (2)$$

Additional processes of producing phosphorus pentafluoride ($PF_5$) along with other reaction products can be exemplified by the following reactions:

$$3PCl_5 + 5AsF_3 \rightarrow 3PF_5 + 5AsCl_3 \quad (3)$$

$$5PF_3 + 3Cl_2 \rightarrow 3PF_5 + 2PCl_3 \quad (4)$$

$$POF_3 + 2HF \rightarrow PF_5 + H_2O \quad (5)$$

Conventional methods that react elemental fluorine with phosphorus include the low temperature fluorination of red phosphorus powder suspended in a solvent such as $CFCl_3$, and fluorinating red phosphorus powder with an excess, such as about 1 to 10 fold excess, of a metal fluoride such as calcium fluoride ($CaF_2$) in a batch reaction.

SUMMARY OF THE INVENTION

Processes and systems for the production of phosphorus pentafluoride ($PF_5$) through continuous fluorination of phosphorus are provided herein.

In one aspect, a process for producing phosphorus pentafluoride is provided that includes the steps of: providing a phosphorus feed stream to a reactor, the phosphorus in the phosphorous feed stream being elemental phosphorus comprising white phosphorus or yellow phosphorus; providing a fluorine feed stream to the reactor, the fluorine feed stream being a vapor stream comprising elemental fluorine gas; reacting the phosphorus feed stream and the fluorine feed stream in the reactor according to the stoichiometry $$P + 2.5F_2 \rightarrow PF_5$$

and removing a product stream from the reactor that comprises phosphorus pentafluoride. The phosphorus feed stream can be a liquid phosphorus feed stream, and the process can include the step of providing the liquid phosphorus feed stream to a reactor through at least one nozzle in the form of a spray.

In another aspect, a process for producing phosphorus pentafluoride is provided that includes the steps of: providing a first phosphorus stream to a vaporizer, the first phosphorus stream comprising liquid phosphorus, solid phosphorus, or mixtures thereof; vaporizing the first phosphorus stream in the vaporizer to form a phosphorus feed stream; providing the phosphorus feed stream to a reactor, the phosphorus in the phosphorous feed stream being elemental phosphorus comprising white phosphorus or yellow phosphorus; providing a fluorine feed stream to the reactor, the fluorine feed stream being a vapor stream comprising elemental fluorine gas; reacting the phosphorus feed stream and the fluorine feed stream in the reactor according to the stoichiometry $$P + 2.5F_2 \rightarrow PF_5$$

and removing a product stream from the reactor that comprises phosphorus pentafluoride.

BRIEF DESCRIPTION OF THE DRAWINGS

Specific examples have been chosen for purposes of illustration and description, and are shown in the accompanying drawings, forming a part of the specification.

DETAILED DESCRIPTION

The present technology relates to the production of phosphorus pentafluoride ($PF_5$) through continuous fluorination of elemental phosphorus with elemental fluorine in a reactor according to the stoichiometry:

$$P + 2.5F_2 \rightarrow PF_5 \quad (6)$$

There is evidence in the literature that liquid phosphorus exists as $P_4$ molecules. When liquid phosphorus vaporizes, it is believed the vapor also consists of $P_4$ molecules up to about 800° C. Above 800° C., $P_4$ is in equilibrium with $P_2$ molecules. Furthermore, diatomic phosphorus begins to break down to monatomic phosphorus above about 1500° C. The exact relationship among these species is complex and several species may be in equilibrium at a given temperature and pressure. One can describe the reaction of phosphorus and elemental fluorine as $0.25P_4 + 2.5F_2 = 1PF_5$ over a range of conditions. However, depending on the exact temperature and pressure conditions, the phosphorus may exist in a different molecular form. For simplicity, we will use the equation $P + 2.5F_2 = PF_5$ to describe the reaction stoichiometry and do not mean to limit it solely to the reaction of a phosphorus atom with diatomic fluorine molecules A continuous reaction can be carried out in a reactor by providing fluorine vapor to the reactor, and introducing phosphorus as a vapor feed stream or a liquid feed stream into the reactor under conditions suitable for promoting the production of phosphorus pentafluoride ($PF_5$).

The phosphorus feed stream provided to the reactor is preferably derived from white phosphorus or yellow phosphorus, and comprises white phosphorus or yellow phosphorus. Elemental phosphorus has several different forms, or allotropes. The most common forms of elemental phosphorus are red phosphorus and white phosphorus. Under certain conditions, such as heating white phosphorus to 250° C. at ambient pressure, or exposing white phosphorus to sunlight, white phosphorus can transform into red phosphorus. Accordingly, some sources of white phosphorus can include some red phosphorus content, which gives the phosphorus a yellow appearance, and is thus referred to as being yellow phosphorus. Red phosphorus does not ignite in air at temperatures below about 240° C. However, white phosphorus must be handled carefully, as it is toxic and ignites in air at temperatures of about 30° C. White phosphorus and yellow phosphorus tend to be in a liquid state at temperatures above about 44° C.

Figure 1:
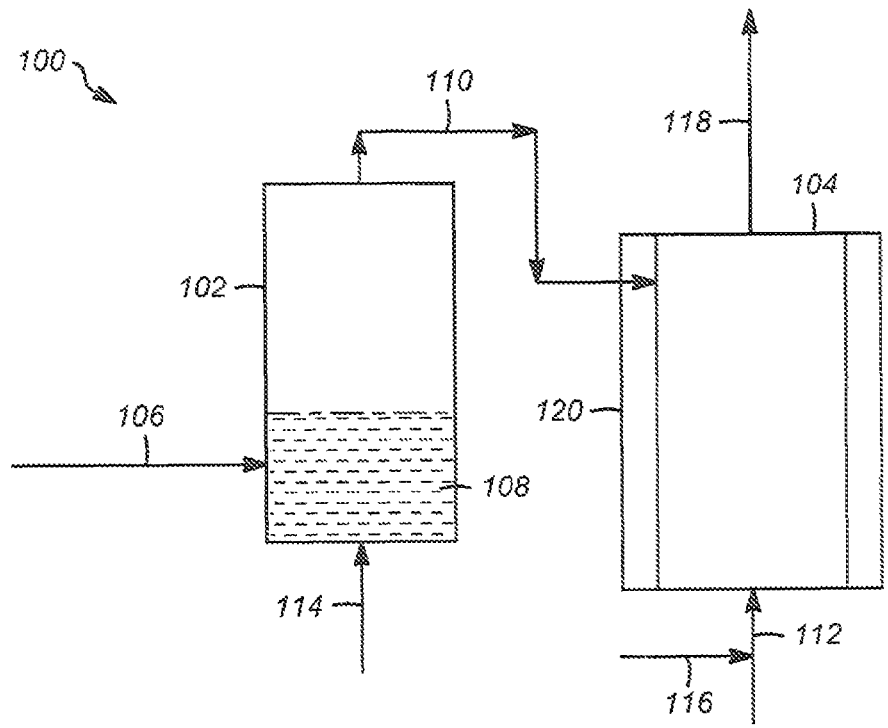
FIG. 1 illustrates one embodiment of a system for producing $PF_5$, wherein liquid phosphorus is vaporized in a vaporizer.

FIG. 1 illustrates a continuous fluorination system 100 for a process of reacting elemental phosphorus with elemental fluorine to produce phosphorus pentafluoride ($PF_5$) in a gas-gas reaction. The continuous fluorination system 100 includes a vaporizer 102 and a reactor 104.

The process begins by providing a first phosphorus stream 106 to the vaporizer 102, and heating the first phosphorus stream 106 to form a second phosphorus stream that is a vapor. The second phosphorus stream can then be provided to the reactor as phosphorus feed stream 110. As illustrated in FIG. 1, the first phosphorus stream 106 can be introduced into the vaporizer 102, and can be contained within the vaporizer 102 as phosphorus supply 108. The first phosphorus stream 106 can contain white phosphorus or yellow phosphorus, and can be in a solid state or a liquid state, or in a combination of states, although the first phosphorus stream 106 is preferably a liquid. Inside the vaporizer 102, the first phosphorus stream 106 can be heated to form phosphorus vapor that can exit the vaporizer 102 to be provided to the reactor as phosphorus feed stream 110. The phosphorus feed stream 110 can be a continuous phosphorus vapor stream, and can be a pure vapor, or can be a vapor with entrained solids and/or liquid.

The vaporizer 102 that receives the first phosphorus stream 106 can be any suitable type of vaporizer. For example, the vaporizer 102 can include a jacketed vessel having an external heat supply, a phase-change heat exchanger such as a shell-and-tube type heat exchanger, steam-heated kettles, a thin film evaporator, or direct contact evaporators, which can bubble a heated gas, such as nitrogen, directly though the liquid phosphorus. In some examples, the process of vaporizing the phosphorus feed stream 106 in the vaporizer 102 can include heating, or superheating, the phosphorus feed stream 106 to a temperature above the boiling point of white phosphorus, such as above about 280° C. In other examples, the process of vaporizing the phosphorus feed stream 106 in the vaporizer 102 includes utilizing a gas stream, the temperature in the vaporizer can be greater than about 50° C., and preferably greater than about 200° C.

It is noted that heating liquid white phosphorus or yellow phosphorus to its boiling point does not tend to result in a complete conversion of liquid white phosphorus into vapor. Instead, a portion of the liquid phosphorus tends to be transformed into solid red phosphorus. Over time, this solid can be deposited on the surfaces of the process equipment which can lead to a decrease in efficiency and/or interruption of the process because the solid phosphorus can accumulate to foul or plug process equipment such as the vaporizer, reactor vessel, or outlet tube. Such fouling can lead to a pressure build-up and a potential safety hazard. The transformation of liquid white phosphorus into solid red phosphorus can be substantially avoided by vaporizing white phosphorus under certain conditions. For example, the formation of red phosphorus can be significantly reduced by rapidly heating liquid white phosphorus to produce phosphorus vapor. Alternatively, if red phosphorus if formed, the formed red phosphorus can be vaporized as well by operating at higher vaporization temperatures. Accordingly, the process of vaporizing the phosphorus feed stream 106 in the vaporizer 102 can include heating the phosphorus feed stream 106 to a temperature of greater than about 280° C. In instances with significant red phosphorous formation, the temperature can preferably be from about 430° C. to about 800° C., and most preferably from about 590° C. to about 700° C.

The formation of red phosphorus also can be significantly reduced by evaporating liquid white phosphorus with the assistance of an inert carrier gas. In one example, the process can include introducing a gas stream 114 into the vaporizer that bubbles up through the liquid phosphorus supply 108. As illustrated in FIG. 1, the gas stream 114 can be introduced at the bottom of the vaporizer 102, and can bubble up through the liquid phosphorus supply 108. The gas stream 114 can be heated to facilitate vaporization of the liquid phosphorus supply 108.

In one example, the gas stream 114 can be an inert carrier gas stream. Inert carrier gases are substances that are substantially un-reactive with fluorine or phosphorus at the operating conditions of the reactions disclosed herein. Examples of suitable inert carrier gases include, but are not limited to, nitrogen ($N_2$), phosphorus pentafluoride ($PF_5$), hydrogen fluoride, and noble gases such as helium (He), neon (Ne), argon (Ar), and mixtures thereof. While not being bound by any particular theory, it is believed that an inert carrier gas can increase the evaporation rate of the liquid phosphorus in the vaporizer 102. In addition, or alternatively, the inert carrier gas can facilitate flow of materials through the system, such as facilitating the flow of vaporized phosphorus from the vaporizer and into the reactor, and can also regulate the temperature of one or more components of the system, and dilute the concentration of reactants.

Additionally, or alternatively, the first phosphorus stream 106 can contain an inert carrier gas. In examples where the phosphorus feed stream 106 includes an inert carrier gas, the inert carrier gas and the phosphorus are preferably present in the phosphorus feed stream 106 in a weight ratio of about 0.2:1 to about 10:1, and more preferably from about 0.5:1 to about 8:1, relative to the total weight of the phosphorus feed stream 106.

In another example, the gas stream 114 can be a reactive gas stream that includes an inert carrier gas and elemental fluorine gas ($F_2$). Examples of suitable inert carrier gases include, but are not limited to, nitrogen ($N_2$), phosphorus pentafluoride ($PF_5$), hydrogen fluoride, and noble gases such as helium (He), neon (Ne), argon (Ar), and mixtures thereof. The elemental fluorine in the gas stream 114 can react with phosphorus in the vaporizer to produce phosphorus fluorides, which can be an exothermic reaction that can provide heat to facilitates the vaporization of the first phosphorus stream 106 in the vaporizer 102.

The pressure at which the vaporizer 102 can heat the phosphorus feed stream 106 can be from about 1 psia to about 100 psia, preferably from about 10 psia to about 28 psia, and more preferably from about 14 psia to about 25 psia. The residence time of the phosphorus in the vaporizer 102 can be any suitable amount of time, including, for example, less than about 2 hours, preferably from about 10 seconds to about 20 minutes, and more preferably from about 1 minute to about 10 minutes. The vaporizer 102 can have a single heating zone or multiple heating zones. In examples where a gas stream is introduced to the vaporizer 102 that includes fluorine gas, the vaporizer 102 does not necessarily include any heating zones. In addition, vaporization of liquid phosphorus and superheating of the resulting phosphorus vapor can occur in separate zones or in the same zone within the vaporizer 102.

The phosphorus feed stream 110 can exit the vaporizer 102, and the process can include introducing the phosphorus feed stream 110 into the reactor 104. The conduit for phosphorus feed stream 110 can be heated to prevent condensation of the vapor. The process can also include introducing a fluorine feed stream 112 into the reactor 104. The fluorine feed stream 112 can be introduced at a single location, as illustrated in FIG. 1, and also in FIGS. 2-5, or can be introduced into the reactor at a plurality of locations. The fluorine feed stream 112 can be a vapor stream that includes fluorine gas, preferably elemental fluorine gas ($F_2$). The fluorine feed stream can also include an inert carrier gas, which can be introduced to the fluorine feed stream in inert fluorine carrier gas stream 116. While not being bound by any particular theory, it is believed that an inert fluorine carrier gas 116 can be useful for facilitating the flow of phosphorus pentafluoride ($PF_5$) product out of the reactor and for dissipating heat from the highly exothermic reaction between the phosphorus and fluorine, thereby controlling the temperature of the reactor. In examples where the fluorine feed stream 112 comprises an inert fluorine carrier gas, the inert fluorine carrier gas and fluorine are preferably present in the fluorine feed stream 112 in a weight ratio of about 0.5:1 to about 10:1, preferably from about 0.5:1 to about 8:1, based on the total weight of the fluorine feed stream 112. Examples of suitable inert gases that can be utilized as inert fluorine carrier gases are the same as those discussed above, including, but not limited to, nitrogen ($N_2$), phosphorus pentafluoride ($PF_5$), hydrogen fluoride, and noble gases such as helium (He), neon (Ne), argon (Ar), and mixtures thereof.

The phosphorus feed stream 110 and the fluorine feed stream 112 can each be introduced into the reactor 104 on a continuous basis, and can preferably be introduced into the reactor 104 contemporaneously with one another. The phosphorus feed stream 110 and fluorine feed stream 112 can each be introduced into the reactor 104 at any suitable rate. Preferably, the fluorine feed stream 112 provides elemental fluorine ($F_2$) to the reactor 104 in a stoichiometric amount or a stoichiometric excess, based upon the amount of phosphorus provided to the reactor 104 by the phosphorus feed stream 110. For example, the fluorine feed stream 112 can provide at least 5 atoms of fluorine for each atom of phosphorus that is provided to the reactor 104 by the phosphorus feed stream 110.

The phosphorus feed stream 110 and the fluorine feed stream 112 can be reacted within the reactor 104 to produce phosphorus pentafluoride ($PF_5$) under any suitable reaction conditions. Preferably the temperature at which the reaction occurs within the reactor 104 can be greater than about 200° C. The pressure within the reactor 104 can preferably be from about 1 psia to about 70 psia, more preferably from about 10 psia to about 50 psia, and most preferably from about 10 psia to about 25 psia.

As illustrated in FIG. 1, a product stream 118 comprising phosphorus pentafluoride ($PF_5$) exits the reactor. The product stream 118 can be a vapor. Any inert carrier gas introduced into the system can be separated from the phosphorus pentafluoride ($PF_5$) prior to final processing. In one example, inert gas can be separated from the product stream 118 via a separator downstream of the reactor 104. In some examples, inert carrier gas can be recycled into the system.

Figure 2:
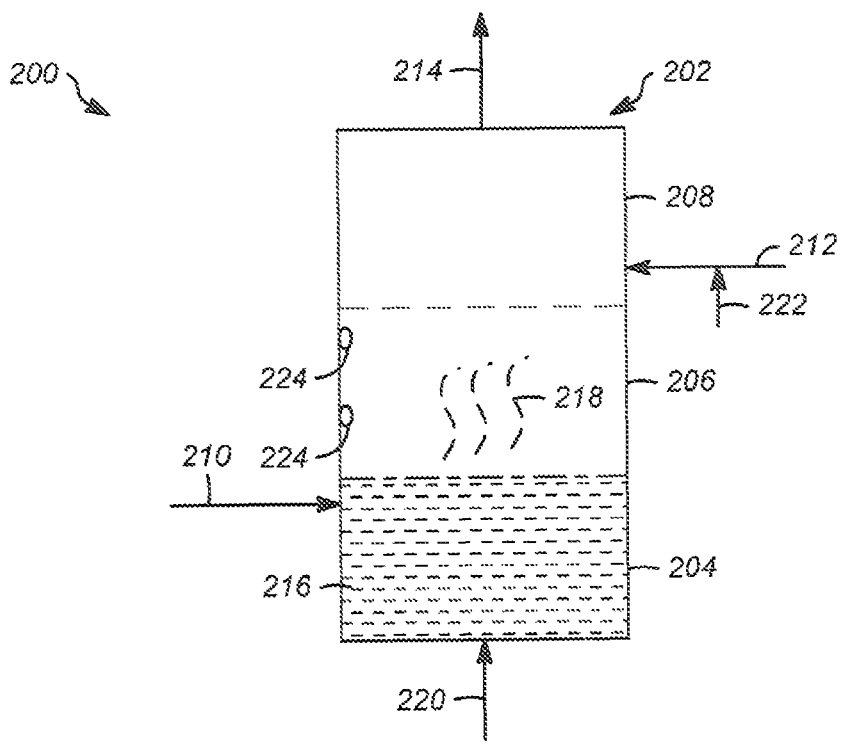
FIG. 2 illustrates a second embodiment of a system for producing $PF_5$, wherein liquid phosphorus is vaporized in the bottom zone of a reactor.

FIG. 2 illustrates another continuous fluorination system 200 for a process of reacting phosphorus with elemental fluorine to produce phosphorus pentafluoride ($PF_5$) in a gas-gas reaction. The system 200 shown in FIG. 2 includes a reactor 202 having three zones including a bottom zone 204, a central zone 206, and a top zone 208. Within the reactor 202, a phosphorus feed stream 210 is vaporized and reacted with a fluorine feed stream 212, to produce a product stream 214 containing phosphorus pentafluoride ($PF_5$).

In the continuous fluorination system 200 shown in FIG. 2, a phosphorus feed stream 210 can be introduced into the bottom zone 204 of the reactor 202, and can be contained within the bottom zone 204 of the reactor 202 as phosphorus supply 216. The phosphorus feed stream 210 can contain white phosphorus or yellow phosphorus, and can be in a solid state or a liquid state, although the phosphorus feed stream 210 is preferably a liquid. Within the bottom zone 204 of the reactor 202, the phosphorus feed stream 210 can be vaporized to form phosphorus vapor 218 that can rise into the central zone 206 of the reactor 202. The phosphorus vapor 218 can be a pure vapor, or can be a vapor with entrained solids and/or liquid.

As described above with respect to FIG. 2, the process of vaporizing the phosphorus in the bottom zone 204 of the reactor 202 can be accomplished in any suitable manner. In one example, the phosphorus feed stream 210 can be introduced into the bottom zone 204 of the reactor 202 in metered amounts which can be vaporized by heating the phosphorus feed stream 210 to a temperature above about 280° C., preferably to a temperature from about 430° C. to about 800° C., and more preferably from about 590° C. to about 700° C. In another example, a larger volume of the phosphorus feed stream 210 can be introduced into the bottom zone 204 of the reactor 202 to provide a phosphorus supply 216 having a desired volume. In such an example, the reactor 202 can include a divider between the bottom zone 204 and the central zone 206, which can have one or more orifices through which the phosphorus vapor 218 can rise to undergo the fluorination reaction. The phosphorus feed stream 210 as contained within the reactor in phosphorus supply 216 can then be vaporized by heating the phosphorus feed stream 210 to a temperature above about 280° C., preferably to a temperature from about 430° C. to about 800° C., and more preferably from about 590° C. to about 700° C. Alternatively, vaporizing the phosphorus feed stream 210 as contained within the reactor in phosphorus supply 216 can include introducing an inert carrier gas stream 220 into the bottom zone 204 of the reactor 202 that bubbles up through the liquid phosphorus supply 216. The inert carrier gas stream 220 can be heated to facilitate vaporization of the phosphorus feed stream 210 contained within the reactor 202 as the liquid phosphorus supply 216.

A fluorine feed stream 212 can be introduced in the top zone 208 of the reactor 202, as illustrated in FIG. 2, or in the central zone 206 of the reactor 202. The fluorine feed stream 212 is preferably a vapor stream that includes, consists of, or consists essentially of elemental fluorine in the form of fluorine gas ($F_2$). The fluorine feed stream 212 can also include an inert carrier gas, which can be introduced to the fluorine feed stream 212 in a stream of inert fluorine carrier gas 222. While not being bound by any particular theory, it is believed that an inert fluorine carrier gas 222 can be useful for facilitating the flow of phosphorus pentafluoride ($PF_5$) product out of the reactor and for dissipating heat from the highly exothermic reaction between the phosphorus and fluorine, thereby controlling the temperature of the reactor 202. In examples where the fluorine feed stream 212 comprises an inert fluorine carrier gas 222, the inert fluorine carrier gas and fluorine are preferably present in the fluorine feed stream 212 in a weight ratio of about 0.5:1 to about 10:1, preferably from about 0.5:1 to about 8:1, based on the total weight of the fluorine feed stream 212. Examples of suitable inert gases that can be utilized as inert fluorine carrier gases are the same as those discussed above, including, but not limited to, nitrogen ($N_2$), phosphorus pentafluoride ($PF_5$), hydrogen fluoride, and noble gases such as helium (He), neon (Ne), argon (Ar), and mixtures thereof.

The fluorine feed stream 212 can be introduced into the reactor 202 on a continuous basis, and can be introduced into the reactor 202 at any suitable rate. Preferably, the fluorine feed stream 212 provides elemental fluorine ($F_2$) to the reactor 202 in a stoichiometric amount or a stoichiometric excess, based upon the amount of phosphorus provided to the central zone 206 or top zone 208 of the reactor 202 in the phosphorus vapor 218. For example, the fluorine feed stream 212 can provide at least 5 atoms of fluorine for each atom of phosphorus that is provided to the reactor 202 by the phosphorus vapor 218.

The phosphorus vapor 218 and the fluorine feed stream 212 can be reacted within the reactor 202 to produce phosphorus pentafluoride ($PF_5$) under any suitable reaction conditions. Preferably the temperature at which the reaction occurs within the reactor 202 can be greater than about 200° C. The pressure at which the reaction occurs within the reactor 202 can preferably be from about 1 psia to about 70 psia, more preferably from about 10 psia to about 50 psia, and most preferably from about 10 psia to about 25 psia.

As illustrated in FIG. 2, a product stream 214 comprising phosphorus pentafluoride ($PF_5$) can exit the reactor. The product stream 214 can be a vapor. Any inert carrier gas introduced into the system can be separated from the phosphorus pentafluoride ($PF_5$) prior to final processing. In one example, inert gas can be separated from the product stream 214 via a separator downstream of the reactor 202. In some examples, inert carrier gas can be recycled into the system.

Figure 3:
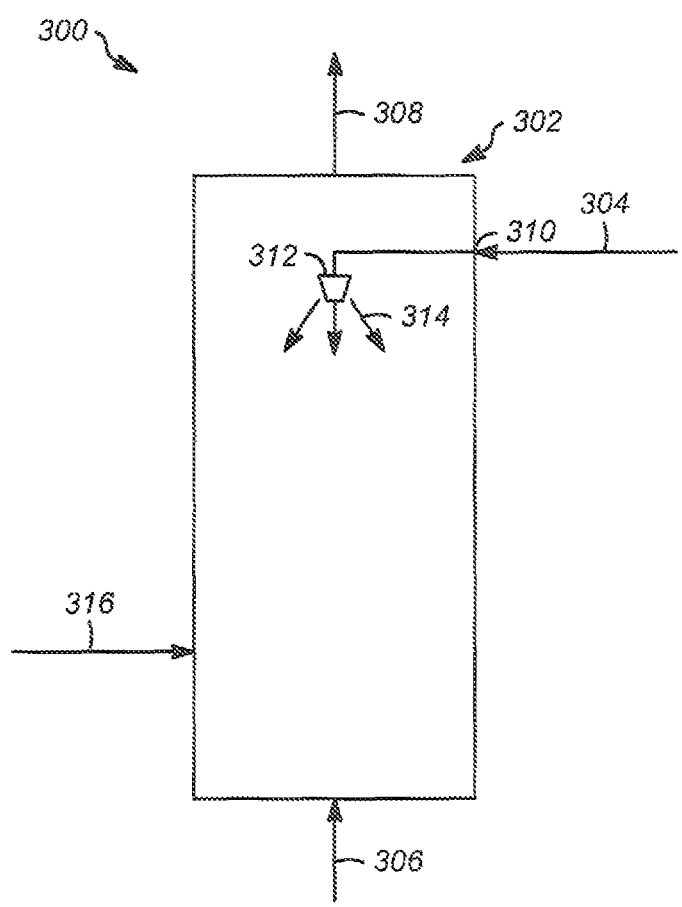
FIG. 3 illustrates a third embodiment of a system for producing $PF_5$, wherein liquid phosphorus is sprayed into a reactor.
Figure 4:
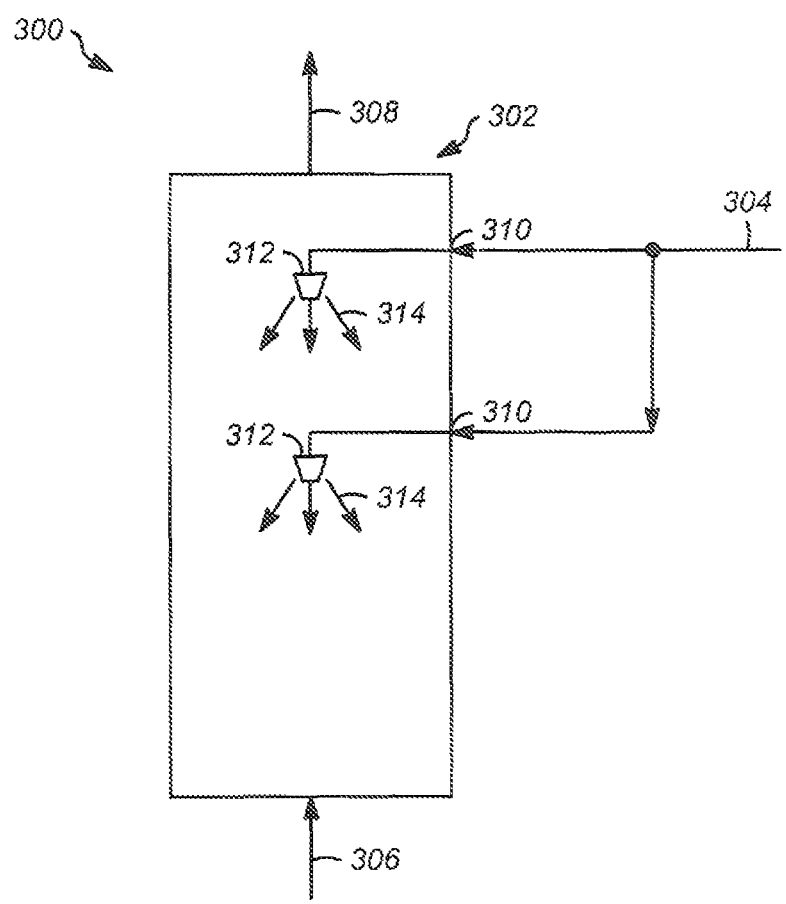
FIG. 4 illustrates the embodiment of FIG. 3, wherein the liquid phosphorus is received by the reactor through a plurality of inlets.
Figure 5:
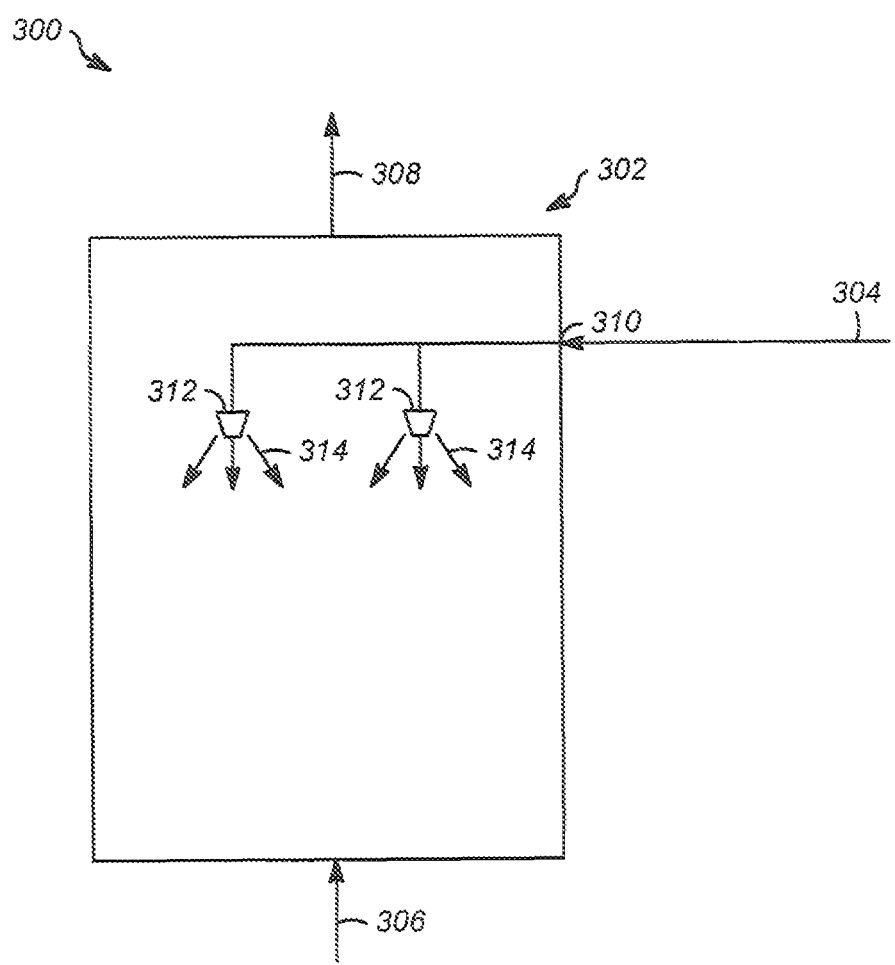
FIG. 5 illustrates the embodiment of FIG. 3, wherein the liquid phosphorus is provided to the reactor through a plurality of nozzles.

FIGS. 3-5 illustrate examples of a continuous fluorination system 300 for a process of reacting phosphorus with fluorine to produce phosphorus pentafluoride ($PF_5$) in a liquid-gas reaction. The system 300 as shown in FIGS. 3-5 includes a reactor 302 that receives a phosphorus feed stream 304 and a fluorine feed stream 306. The phosphorus feed stream 304 and a fluorine feed stream 306 are reacted within the reactor 302 to produce a product stream 308 including phosphorus pentafluoride ($PF_5$).

The phosphorus feed stream 304 can include elemental phosphorus, which can be a liquid, and can include white phosphorus or yellow phosphorus. In one example, the phosphorus feed stream 304 can consist of, or consist essentially of elemental phosphorus. In another example, the phosphorus feed stream 304 can include, consist of, or consist essentially of elemental phosphorus and an inert carrier gas. Examples of suitable inert carrier gases that can be utilized as inert fluorine carrier gases are the same as those discussed above, including, but not limited to, nitrogen ($N_2$), phosphorus pentafluoride ($PF_5$), hydrogen fluoride, noble gases such as helium (He), neon (Ne), and argon (Ar), and mixtures thereof. The inclusion of an inert carrier gas in the phosphorus feed stream 304 can serve to dilute the amount of phosphorus in the phosphorus feed stream 304, increase the pressure of the phosphorus feed stream 304, facilitate the flow of the phosphorus in the phosphorus feed stream 304 or of the reaction product produced in the reactor 302, and/or regulate the temperature of the reaction in the reactor 302. When the phosphorus feed stream 304 includes elemental phosphorus and an inert carrier gas, the phosphorus feed stream 304 can contain the elemental phosphorus and the inert carrier gas in a ratio from about 1:50 to about 20:1 by weight, preferably a ratio from about 1:10 to about 2:1 by weight. The phosphorus feed stream 304 can be introduced into the reactor 302 at any suitable temperature, such as, for example, from about 44° C. to about 280° C., preferably from about 50° C. to about 200° C., and more preferably from about 50° C. to about 100° C.

The phosphorus feed stream 304 can be received by the reactor 302 through at least one inlet 310, as shown in FIGS. 3 and 5, or through a plurality of inlets 310 as shown in FIG. 4. Additionally, the phosphorus feed stream 304 can be introduced into the reactor 302 through at least one nozzle 312, as illustrated in FIG. 3, or through a plurality of nozzles 312 as illustrated in FIGS. 4 and 5. The at least one nozzle 312 can provide the phosphorus feed stream 304 to the reactor in the form of a spray 314. As used herein, the term "spray" means a liquid provided as a plurality of dispersed droplets, and can include, but is not limited to, a mist, or a shower. A spray can also include liquid provided as a plurality of dispersed droplets that are entrained in a surrounding gas. The at least one nozzle 312 can be located within the reactor 302 at any suitable height and orientation. The at least one nozzle 312 can be located within the reactor 302 spaced away from the inner surface of the reactor, on the inner surface of the reactor 302, or outside of the reactor 302 provided that the at least one nozzle is fluidly connected to the reactor 302 by a conduit having a length sufficient to maintain the phosphorus feed stream 304 in the form of a spray. Additionally, the at least one nozzle 312 can be oriented to spray downwardly, as illustrated in FIGS. 3-5, or can be oriented to spray in any other suitable direction, including, but not limited to, upwardly.

The at least one nozzle 312 can provide the phosphorus feed stream 304 to the reactor in a flow that is countercurrent relative to the flow of the fluorine feed stream 306, co-current relative to the flow of the fluorine feed stream 306, or cross-current relative to the flow of the fluorine feed stream 306. In examples including a plurality of nozzles 312, the nozzles can be configured in any suitable manner for providing the phosphorus feed stream 304 into the reactor 302. For example, the plurality of nozzles 312 can be in multiple planes as shown in FIG. 4, or in a single plane, as shown in FIG. 5. Examples of suitable types of nozzles include, but are not limited to hydraulic spray nozzles, internally mixed gas atomized spray nozzles, externally mixed gas atomized spray nozzles, rotary atomizers, and ultrasonic nozzles.

The fluorine feed stream 306 can be a vapor that includes elemental fluorine ($F_2$). In one example, the fluorine feed stream 306 can consist of, or consist essentially of elemental fluorine ($F_2$). In another example, the fluorine feed stream 306 can include, consist of, or consist essentially of elemental fluorine ($F_2$) and an inert carrier gas. Examples of suitable inert carrier gases that can be utilized as inert fluorine carrier gases are the same as those discussed above, including, but not limited to, nitrogen ($N_2$), phosphorus pentafluoride ($PF_5$), hydrogen fluoride, and noble gases such as helium (He), neon (Ne), and argon (Ar). The inclusion of an inert carrier gas in the fluorine feed stream 306 can serve to dilute the amount of fluorine in the fluorine feed stream 306, increase the pressure of the fluorine feed stream 306, facilitate the flow of the fluorine in the fluorine feed stream 306 or of the reaction product produced in the reactor 302, and/or regulate the temperature of the reaction in the reactor 302. When the fluorine feed stream 306 includes elemental fluorine ($F_2$) and an inert carrier gas, the fluorine feed stream 306 can contain the elemental fluorine ($F_2$) and the inert carrier gas in a ratio from about 0.5:1 to about 10:1 by weight, preferably a ratio from about 0.5:1 to about 8:1 by weight. The fluorine feed stream 306 can be introduced into the reactor 302 at any suitable temperature, such as, for example, from about 20° C. to about 200° C., and preferably from about 50° C. to about 100° C. For example, the fluorine feed stream can be introduced into the reactor 302 at ambient temperature.

The phosphorus feed stream 304 and the fluorine feed stream 306 can each be introduced into the reactor 302 on a continuous basis, and can preferably be introduced into the reactor 302 contemporaneously with one another. The phosphorus feed stream 304 and fluorine feed stream 306 can each be introduced into the reactor 302 at any suitable rate. Preferably, the fluorine feed stream 306 provides elemental fluorine ($F_2$) to the reactor 302 in a stoichiometric amount or a stoichiometric excess, based upon the amount of phosphorus (P) provided to the reactor 302 by the phosphorus feed stream 304. For example, the fluorine feed stream 304 can provide at least 5 atoms of fluorine for each atom of phosphorus that is provided to the reactor 302 by the phosphorus feed stream 304.

The phosphorus feed stream 304 and the fluorine feed stream 306 can be reacted within the reactor 302 to produce phosphorus pentafluoride ($PF_5$) under any suitable reaction conditions, including but not limited to, the reaction conditions discussed above with respect to FIGS. 1 and 2.

Optionally, an inert carrier gas can be added to the reactor 302 in a separate inert carrier gas stream 316, as illustrated in FIG. 3. Examples of suitable inert carrier gases that can be utilized as inert fluorine carrier gases are the same as those discussed above, including, but not limited to, nitrogen ($N_2$), phosphorus pentafluoride ($PF_5$), hydrogen fluoride and noble gases such as helium (He), neon (Ne), and argon (Ar). The inclusion of an inert carrier gas stream 316 can serve to dilute the amount of the phosphorus and fluorine reactants within the reactor 302, facilitate the flow of the reactants and the reaction product produced in the reactor 302, and/or regulate the temperature of the reaction in the reactor 302.

As illustrated in FIGS. 3-5, a product stream 308 comprising phosphorus pentafluoride ($PF_5$) exits the reactor 302. The product stream 308 can be a vapor.

Any inert carrier gas introduced into the systems described herein disclosed herein for the continuous fluorination of phosphorus, such as those illustrated in FIGS. 1-5, can be separated from the product stream containing phosphorus pentafluoride ($PF_5$) prior to final processing. In one example, inert gas can be separated from the product stream via a separator downstream of the reactor. In some examples, inert carrier gas can be recycled into the system.

The systems and processes disclosed herein for the continuous fluorination of phosphorus can produce product streams consisting of or consisting essentially of substantially pure phosphorus pentafluoride ($PF_5$). For example, any of the product streams described above can include less than about 1% by weight impurities based upon the weight of the product stream, preferably less than about 0.5% by weight impurities based upon the weight of the product stream, and more preferably less than about 0.1% by weight impurities based upon the weight of the product stream. The term "impurities" being used to mean any material other than phosphorus pentafluoride ($PF_5$), phosphorus, any materials introduced to the system in the phosphorus feed stream, fluorine, any materials introduced to the system in the fluorine feed stream, or any inert gas introduced into the system. To the extent that impurities may be present in the product stream of phosphorus pentafluoride ($PF_5$), the impurity expected to be most common is $POF_3$, although the production of $POF_3$ can be reduced by removing water from the phosphorus feed stream, such as with a nitrogen purge, prior to reacting the phosphorus and the fluorine. Additionally, the product stream of phosphorus pentafluoride ($PF_5$) is preferably substantially free of $PF_3$, an impurity commonly produced when employing conventional reaction techniques for producing phosphorus pentafluoride ($PF_5$).

Any of the reactors described herein can include a temperature regulation system 120 as shown in FIG. 1, which can include, for example, a cooling jacket or shell. Additionally, the reaction zone of any of the reactors described herein can include a reaction condition control system 224 as illustrated in FIG. 2, which can include temperature and pressure sensors to facilitate regulation of the temperature and pressure within the reactor. Additionally, the product and reactant contact surfaces of the reactors described herein are preferably made of material that is compatible with elemental fluorine and with elemental phosphorus at elevated temperatures, including for example, Inconel™, nickel, and Monel™. The presence of oxygen, water, or other contaminants at the start of a reaction cycle in any of the reactors as described above with reference to FIGS. 1-4 can produce unwanted reaction byproducts and/or be introduced as impurities in the final product. Accordingly, it is preferred that product and reactant contact surfaces of the reactors be passivated with fluorine, preferentially diluted with an inert gas such as nitrogen ($N_2$), which will remove such contaminants. The vaporizers and reactors as described above with reference to FIGS. 1-4 can also be placed inside an inert gas purged case to avoid contacting the white phosphorus or yellow phosphorus with air.

In certain preferred embodiments, the method further comprises reacting the phosphorus pentafluoride synthesized as described herein with lithium fluoride to produce a product comprising lithium hexafluorophosphate. Preferably, lithium hexafluorophosphate is prepared by reacting the $PF_5$ with lithium fluoride in anhydrous hydrofluoric acid solution. Preferably, the reactants are substantially free of moisture to avoid the formation of undesirable lithium oxyfluoro phosphate. In certain embodiments, an 0.1-10 wt. % fluorine in nitrogen stream can be bubbled through the solution of anhydrous hydrofluoric acid solution or through the lithium fluoride in anhydrous hydrofluoric acid solution to remove moisture.

In a preferred embodiment, $PF_5$ gas is contacted with a LiF/HF solution having a LiF concentration of about 2 mol % to about 20 mol %. The contacting preferably involves continuously circulating the $PF_5$ gas though the LiF/HF solution or charging the $PF_5$ gas into a reactor containing the LiF/HF solution and then continuously stirring the solution. The reaction temperature is preferably maintained at a temperature of about −84.4 to about +20° C. Once the reaction is substantially complete, the temperature of the reactor contents is heated to evaporate the HF, leaving a solid $LiPF_6$ product.

EXAMPLES

The following examples are provided to facilitate an understanding of the invention and are not intended to limit the invention in any way.

Example 1

Demonstration of Conversion of White to Red Phosphorus

While under a nitrogen atmosphere, approximately 0.5 g of solid white phosphorus was added to an evacuated, 10 mm glass tube equipped with Teflon™ valve. The tube was sealed with the Teflon valve and heated in an oil bath or with a heating tape at an elevated temperature from about 200° C. to about 250° C. for various time periods. Gradual change of white to red phosphorus was observed. When the tube was heated to a temperature of 250° C. for a period of 4 hours, conversion of white phosphorus to red phosphorus was observed to be about 20% by weight of the original white phosphorus sample.

Example 2

Vaporization of White Phosphorus

About 5.0 g of white phosphorus was placed in an Inconel tube having a diameter of about 0.5 inches and a length of about 1 ft that was equipped with a valve. The sample was heated in a furnace from an initial temperature of about 25° C. to a final temperature of about 800° C. at ambient pressure. Phosphorus vapor was thus formed, and was collected in a water cooled trap. After about 1 hour, the heating was discontinued the tube was allowed to cool. The tube was weighed before and after the vaporization; the weight was almost the same as tare, indicating that approximately all of the white phosphorus had been converted to vapor form.

Example 3

Nitrogen Gas Assisted Vaporization of White Phosphorus

About 85 g white phosphorus, under purge of nitrogen into a clean, dry and leak tested stainless reactor having a 200 mL capacity, which was equipped with a dip tube, an outlet and a temperature probe. The reactor was then evacuated, connected to two traps (pre weighed) and a scrubber in series. A nitrogen tee was also connected between the bubbler and the traps so that no back up of scrubber material would take place. The scrubber contained water. The white phosphorus in the reactor was slowly heated with a heat tape to melt the white phosphorus. The conduit from the reactor outlet to first trap was also heated to a temperature from about 290° C. to about 300° C. by heat tape. Once the desired reactor temperature was reached, nitrogen was purged (50-300 SCCM) through the reactor (by opening valves from $N_2$ purge to the reactor dip leg) for a few seconds to make sure that there would be no clogging in the exits of the system. Then nitrogen was passed through molten white phosphorus at a constant flow rate from about 100 sccm to about 150 sccm, and at a temperature from about 212° C. to about 220° C. in order to vaporize the molten white phosphorus. The vaporized white phosphorus was collected in the traps. After passing the nitrogen through the molten white phosphorus for about 20 minutes, about 1.0 g pf phosphorus vapor was obtained in the traps.

Example 4

HF Vapor Assisted Vaporization of White Phosphorus

The experiment was conducted the same manner as described in Experiment 3 except that HF vapor was used instead of nitrogen, and the scrubber contained 10% aqueous KOH to neutralize any HF vapor before it was vented. The HF vapor was passed through molten white phosphorus at a constant flow rate from about 7 g/0.5 hour, and at a temperature from about 218° C. to about 220° C. in order to vaporize the molten white phosphorus. After passing the HF vapor through the molten white phosphorus for about for 30 min., about 1.4 g of phosphorus vapor and about 6.4 g of HF vapor was collected in the trap.

Example 5

$PF_5$ Vapor Assisted Vaporization of White Phosphorus

The experiment was conducted the same manner as described in Experiment 4 except that $PF_5$ vapor was used instead of HF. The $PF_5$ vapor was passed through molten white phosphorus at a constant flow rate from about 60 sccm, and at a temperature from about 220° C. to about 225° C. in order to vaporize the molten white phosphorus. After passing the $PF_5$ vapor through the molten white phosphorus for about 30 minutes, about 1.5 g pf phosphorus vapor was obtained in the traps.

Example 6

Reaction Phosphorus Vapor with Fluorine

Vaporization of white phosphorus is conducted as in Example 2, and the phosphorus vapor formed is fed into a reactor where it is mixed with elemental fluorine gas ($F_2$) to form a vapor product stream. The vapor product stream is collected in a cold trap, and IR spectroscopy is utilized to confirm that the vapor product stream contains phosphorus pentafluoride ($PF_5$).

Example 7

Vaporization of Phosphorus with a Reactive Gas

Approximately 100 grams of white phosphorus is added to a vessel outfitted with a dipleg which extends nearly to the bottom of the vessel for the introduction of gas and a vapor outlet port to remove saturated vapor. The outlet is fitted with a pressure control valve. The phosphorus is first thoroughly dried under vacuum. The dry white phosphorus is preheated to 200° C. The heat is then turned off and nitrogen is introduced through the dipleg and bubbled through the molten phosphorus while maintaining a pressure in the vessel at 10 psig. The nitrogen contains 8% by weight fluorine. The fluorine reacts with the phosphorus to form $PF_3$, and generates heat sufficient to vaporize additional phosphorus with no external heating. The resulting gas stream contains 2.7 grams of nitrogen per gram of phosphorus, as well as 0.3 grams $PF_3$ per gram of phosphorus. This mixed gas stream is reacted with $F_2$ to produce $PF_5$.

From the foregoing, it will be appreciated that although specific examples have been described herein for purposes of illustration, various modifications may be made without deviating from the spirit or scope of this disclosure. It is therefore intended that the foregoing detailed description be regarded as illustrative rather than limiting, and that it be understood that it is the following claims, including all equivalents, that are intended to particularly point out and distinctly claim the claimed subject matter.

What is claimed is:

1. A process for producing phosphorus pentafluoride, the process comprising the steps of:
    providing a phosphorus feed stream to a reactor, the phosphorus in the phosphorous feed stream being elemental phosphorus comprising white phosphorus or yellow phosphorus;
    providing a fluorine feed stream to the reactor, the fluorine feed stream being a vapor stream comprising elemental fluorine gas; reacting the phosphorus feed stream and the fluorine feed stream in the reactor according to stoichiometry:

$P + 2.5 F_2 \rightarrow PF_5$; and removing a product stream from the reactor that comprises phosphorus pentafluoride, wherein the step of providing a phosphorus feed stream to a reactor comprises:
    introducing a liquid phosphorus feed stream into the reactor; and vaporizing the liquid phosphorus feed stream in the reactor.

2. The process for producing phosphorus pentafluoride of claim 1, wherein the step of vaporizing comprises heating the first phosphorus stream in the vaporizer to a temperature greater than about 200° C.

3. The process for producing phosphorus pentafluoride of claim 1, wherein the liquid phosphorus feed stream is contained in the bottom zone of the reactor as a liquid phosphorus supply, and the step of vaporizing comprises introducing a gas stream into the bottom zone of the reactor that bubbles up through the liquid phosphorus supply.

4. The process for producing phosphorus pentafluoride of claim 3, wherein the gas stream introduced into the bottom zone of the reactor comprises a gas selected from the group consisting of fluorine, nitrogen, phosphorus pentafluoride, hydrogen fluoride, helium, neon, argon, and mixtures thereof.

* * * * *

UNITED STATES PATENT AND TRADEMARK OFFICE
CERTIFICATE OF CORRECTION

| | | |
|---|---|---|
| PATENT NO. | : 8,784,763 B2 | Page 1 of 1 |
| APPLICATION NO. | : 12/722390 | |
| DATED | : July 22, 2014 | |
| INVENTOR(S) | : Luly et al. | |

It is certified that error appears in the above-identified patent and that said Letters Patent is hereby corrected as shown below:

On the title page item (75), line 4, "Philip DePrato" should be -- Philip L. Da Prato --.

Signed and Sealed this
Eighteenth Day of November, 2014

Michelle K. Lee
*Deputy Director of the United States Patent and Trademark Office*